US009752937B2

(12) United States Patent
Daily et al.

(10) Patent No.: US 9,752,937 B2
(45) Date of Patent: Sep. 5, 2017

(54) TEMPERATURE SENSING ASSEMBLY FOR MEASURING TEMPERATURE OF A SURFACE OF A STRUCTURE

(71) Applicants: Jeffrey N. Daily, Houston, TX (US); Larry Welch, Houston, TX (US); Yean C Chan, Johor Behru (MY)

(72) Inventors: Jeffrey N. Daily, Houston, TX (US); Larry Welch, Houston, TX (US); Yean C Chan, Johor Behru (MY)

( * ) Notice: Subject to any disclaimer, the term of this patent is extended or adjusted under 35 U.S.C. 154(b) by 460 days.

(21) Appl. No.: 14/483,965

(22) Filed: Sep. 11, 2014

(65) Prior Publication Data

US 2014/0376594 A1 Dec. 25, 2014

Related U.S. Application Data

(62) Division of application No. 13/233,807, filed on Sep. 15, 2011, now Pat. No. 8,870,455.

(51) Int. Cl.
*G01K 7/00* (2006.01)
*G01K 1/14* (2006.01)
*G01K 1/02* (2006.01)
*G01K 7/04* (2006.01)

(52) U.S. Cl.
CPC ............ *G01K 1/143* (2013.01); *G01K 1/026* (2013.01); *G01K 7/04* (2013.01)

(58) Field of Classification Search
USPC .................. 374/179, 208, 147, 166; 136/230
See application file for complete search history.

(56) References Cited

U.S. PATENT DOCUMENTS 3,874,239 A * 4/1975 Finney .................. G01K 1/143
                                                            136/230
3,907,606 A     9/1975 Chang
4,075,036 A     2/1978 Lysikov
(Continued)

FOREIGN PATENT DOCUMENTS

JP       H07286907     10/1995
WO     2010-100335     9/2010

OTHER PUBLICATIONS

PCT International Search Report, dated Feb. 26, 2013.
(Continued)

*Primary Examiner* — Mirellys Jagan
(74) *Attorney, Agent, or Firm* — Duane Morris LLP; Diana M. Sangalli (57) ABSTRACT

A temperature sensing assembly for measuring the temperature of a surface of a structure includes a thermocouple device having a sheath containing a pair of conductors of dissimilar materials connected at a junction point to provide indications of temperature. The assembly further includes a docking device with a recess formed in a top surface to receive a portion of the sheath that is proximate the junction point. The bottom surface of the docking device is attached to the surface of the structure. The recess extends through the bottom surface of the docking device so that when the thermocouple device is positioned in the recess, the junction point is adjacent the surface of the tube. A heat shield can be attached to the docking device to shield the sheath proximate the junction point from direct and radiant heat sources.

5 Claims, 7 Drawing Sheets

(56) References Cited

U.S. PATENT DOCUMENTS

| | | | | |
|---|---|---|---|---|
| 4,971,452 | A | * | 11/1990 | Finney .................... G01K 1/143 338/28 |
| 5,172,979 | A | | 12/1992 | Barkley |
| 5,372,427 | A | * | 12/1994 | Padovani ................. G01K 1/16 338/22 R |
| 5,454,641 | A | | 10/1995 | Parker |
| 5,707,151 | A | * | 1/1998 | Parker .................... G01K 1/143 236/DIG. 6 |
| 5,993,061 | A | | 11/1999 | Drouet |
| 6,158,886 | A | * | 12/2000 | Dutcher ................. G01K 1/143 374/147 |
| 6,334,707 | B1 | | 1/2002 | Ku |
| 6,761,480 | B2 | * | 7/2004 | Parnicza .................. G01K 7/02 136/230 |
| 6,984,065 | B2 | | 1/2006 | Roepke |
| 7,789,555 | B2 | * | 9/2010 | Harcourt .............. G01D 11/245 374/147 |
| 2002/0041621 | A1 | * | 4/2002 | Faries, Jr. ................ A61M 5/14 374/147 |
| 2002/0064206 | A1 | * | 5/2002 | Gysling ................ E21B 47/065 374/147 |
| 2003/0016730 | A1 | | 1/2003 | Daily |
| 2004/0037350 | A1 | | 2/2004 | Parmicza |
| 2007/0127546 | A1 | * | 6/2007 | Gul .......................... G01K 3/06 374/147 |
| 2007/0175266 | A1 | | 8/2007 | Harcourt |
| 2011/0268154 | A1 | * | 11/2011 | Hao ......................... G01K 1/14 374/208 |

OTHER PUBLICATIONS

PCT International Preliminary Search Report on Patentability, dated Mar. 18, 2014.
Supplementary European Search Report, dated Feb. 18, 2015
Examination Search Report, Canadian Intellectual Property Office, dated Aug. 6, 2015.

* cited by examiner

TEMPERATURE SENSING ASSEMBLY FOR MEASURING TEMPERATURE OF A SURFACE OF A STRUCTURE

RELATED APPLICATIONS

This application is a continuation of U.S. patent application Ser. No. 13/233,807 filed on Sep. 15, 2011, the entirely of which is incorporated herein.

TECHNICAL FIELD

The present invention relates generally to sensing temperature, and, more particularly, to sensing temperature on the surface of a tube within a furnace or other high temperature vessel.

BACKGROUND

The petrochemical and refining industries generally employ various processes where temperature must be measured reliably and with a high degree of accuracy. Typically, the environments in which temperature is measured require subjecting the temperature sensing devices to extreme conditions, including radiant and direct thermal energy sources with temperatures in excess of 1300° F. These harsh conditions present challenges with respect to reliably providing accurate temperature measurements of a particular structure over extended periods of time. For instance, it is oftentimes desirable to acquire temperature measurements of various structures, such as the surface (or skin) of tubes or other conduits, that are present within a furnace or other high temperature vessel used in a refining process to ensure both that the structure is not overheating and that the process is occurring at a desired temperature. However, the high radiant energy within the furnace can make it difficult to obtain an accurate measurement of the surface of a particular structure within the furnace since the temperature measurement device is exposed to thermal sources other than the measured surface. In addition to the harsh radiant conditions, the temperature sensing device also may be exposed to the open flames of the furnace, which can have a detrimental effect on the longevity of the temperature sensing device. As a result, the temperature sensing device often is replaced multiple times over the life of the vessel, which requires shutdown of the refining process. Consequently, if a failed instrumentation cannot be readily removed and a replacement readily installed, the processing downtime can be extremely costly.

Known temperature sensing devices that are used in refining processes include an extractable thermocouple device where the sheath is blindly fed into position through a guide that is welded to the surface of a furnace tube. However, this device is difficult to reliably position both in a desired location and so that the device makes adequate thermal contact with the tube surface at the desired location. For another known temperature sensing device, the thermocouple sheath is welded to a mounting pad that, in turn, is welded directly to the surface of the furnace tube. Removal and replacement of this type of device is difficult due to the time-consuming steps needed to prepare the surface of the tube so that the replacement device can be attached. Such preparation steps may include grinding the tube surface at the location of attachment to remove substances that may impede adherence of the temperature sensor and extensive heat treating of the tube so that the device can be welded thereto. These preparation processes can be very costly in terms of labor and processing downtime. In addition, grinding and heat treating of the tube surface ultimately will result in the need to replace the tube, which likewise is an extremely expensive process.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figures 1, 3, 4, 5:
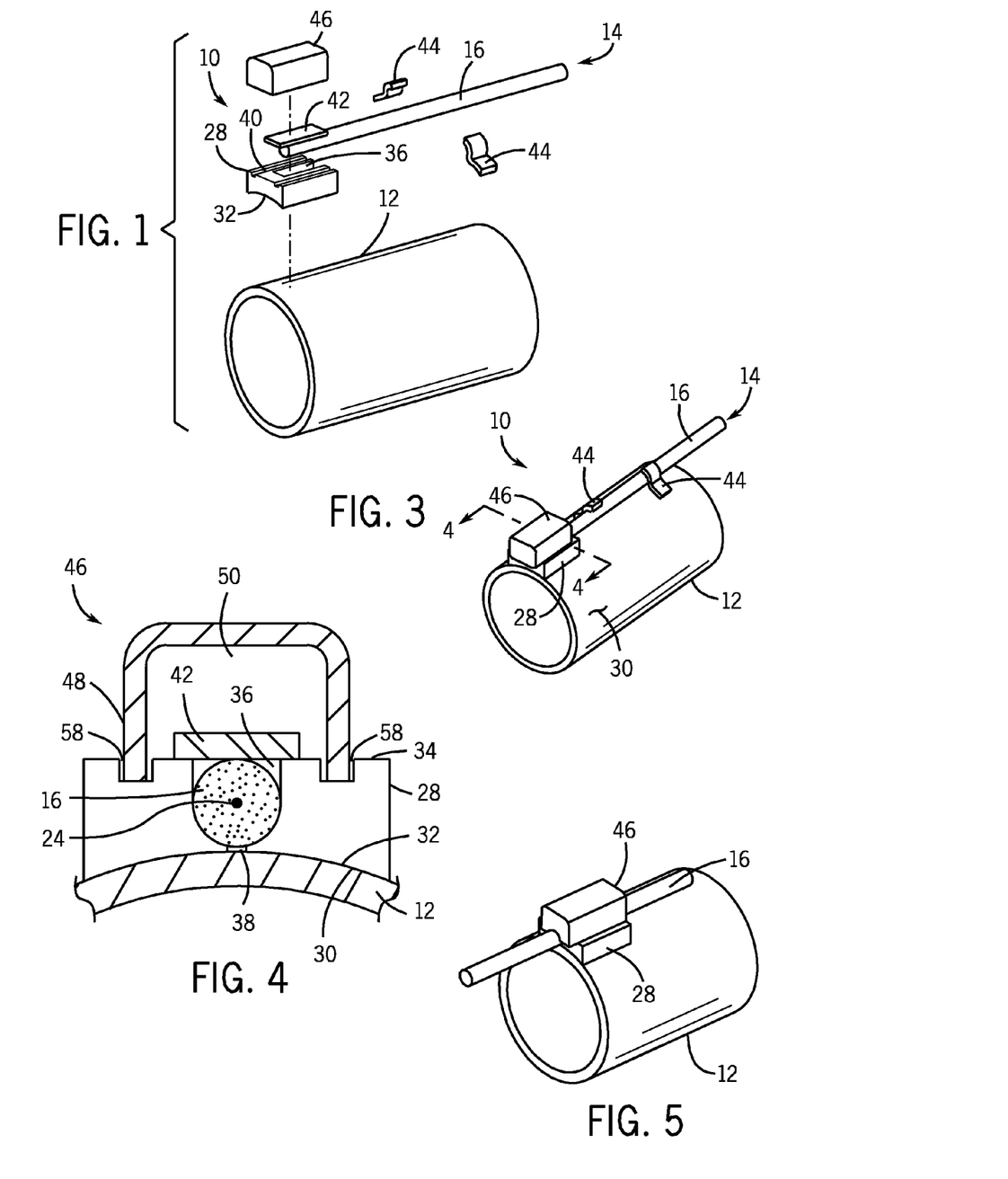
FIG. 1 is an exploded view of an exemplary temperature sensing assembly, according to an embodiment of the invention.
FIG. 3 is a perspective view of the assembled temperature sensing assembly of FIG. 1, according to an embodiment of the invention.
FIG. 4 is a partial cross-sectional view of an embodiment of the assembled temperature sensing assembly of FIG. 3 taken through the heat shield and docking device, according to an embodiment of the invention.
FIG. 5 is a perspective view of another example of an assembled temperature sensing assembly, according to an embodiment of the invention.
Figure 2:
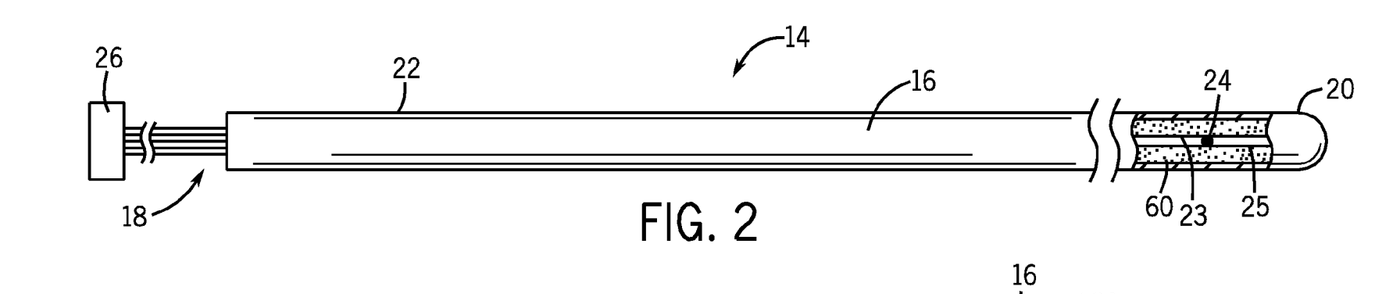
FIG. 2 is an exemplary temperature sensing device, according to an embodiment of the invention.

Referring generally to FIG. 1, an exploded view of a temperature sensing assembly 10 for sensing the temperature at a surface of a structure 12, such as a tube or other conduit, is shown. As will be set forth in further detail below, the temperature sensing assembly 10 is closely coupled thermally to the surface of the tube 12 and is shielded from heat from thermal sources other than the surface of the tube 12. In addition, the assembly 10 is arranged so that a temperature sensor can be readily removed and a replacement sensor can be readily installed. Towards that end, and with reference also to FIG. 2, the temperature sensing assembly 10 shown in FIG. 1 includes a thermocouple device 14 having one or more conductor pairs 18 that are disposed within a longitudinal sheath 16. The sheath 16 has an enclosed distal end 20 and an opposed end 22 from which the one or more conductor pairs 18 extends. Each of the conductor pairs 18 comprises a pair of conductors (e.g., conductors 23, 25) made of dissimilar materials, preferably metals, which are joined at a junction point 24. As an example, the dissimilar materials may be welded together to form the junction point 24. The free ends of the conductor pairs 18 are connected to instrumentation 26, e.g., a voltmeter, that measures the difference in potential created at the junction of the two metals. This difference in potential corresponds to a given temperature.

As best shown in FIGS. 3 and 4, the temperature sensing assembly 10 further includes a mounting or docking device 28 that is attached to a surface 30 of the tube 12. In an exemplary embodiment, the bottom surface 32 of the docking device 28 has a shape that is complementary to the shape of the surface 30 of the tube 12 so that the docking device 28 can be firmly mounted in contact with the surface 30. For instance, as shown in the partial cross-sectional view of FIG. 4, the bottom surface 32 of the docking device 28 is concave to match the convex surface 30 of the tube 12. When the docking device 28 is positioned on the tube, the bottom surface 32 of the device 28 can be attached to the surface 30 of the tube 12, such as by welding. The docking device 28 may be made of a metallic material that is suitable for high temperature environments and can be attached (e.g., by welding), to the surface 30 of the tube 12.

The docking device 28 further has a top surface 34 having a recess 36 formed therein to receive a portion of the sheath 16 of the thermocouple device 14. As best shown in FIG. 4, the recess 36 includes a slot or opening 38 that extends through the bottom surface 32 of the docking device 28 so that a portion of the surface 30 of the tube 12 is exposed. In the embodiment shown, the thermocouple device 14 is configured so that the junction point 24 is located near the enclosed end 20 of the sheath 16. In this manner, when the enclosed end 20 of the sheath 16 is positioned within the recess 36, the junction point 24 also is located within the recess 24. Because the recess 36 positions the sheath 16 in close proximity to and the slot 38 exposes the sheath 16 to the surface 30 of the tube 12, a close thermal coupling can be achieved between the tube surface 30 and the junction point 24. In some embodiments, the slot 38 can be configured so that the portion of the sheath 16 proximate the junction point 24 contacts the surface 30.

The recess 36 is generally defined by an inner surface that has a shape that is complementary to the shape of the outer surface of the sheath 16 so that close thermal coupling is achieved. In the embodiment shown in FIG. 4, the surfaces of the recess 36 and the sheath 16 are generally arcuate. However, it should be understood that other types of linear, curved or curvilinear surfaces are contemplated. As a example, the surface of the recess 36 may have a V-shape that is complementary to a V-shaped sheath 16.

In the embodiment shown in FIGS. 1, 3 and 4, positioning of the enclosed end 20 of the sheath 16 in the recess 36 is facilitated by forming the recess 36 with a stop 40 against which the enclosed end 20 of the sheath 16 is positioned. In other embodiments, the recess 36 may not include a stop 40, and may extend through the entire length of the top surface 32 so that the enclosed end 20 of the sheath 16 may extend from the docking device 28. An example of such an arrangement is shown in FIG. 5. In such embodiments, the location of the junction point 24 within the sheath 16 may be known (e.g., a known distance from the enclosed end 20) so that the junction point 24 may be positioned within the recess 36. Alternatively, the location of the junction point 24 may be discernable via a marking or other visible indicator on the sheath 16 to assist an operator to position the junction point 24 within the recess 36 when installing the temperature sensing assembly 10.

In some implementations of the temperature sensing assembly 10, the sheath 16 further includes a mounting pad 42 that is connected to the sheath 16, such as by welding the mounting pad 42 to an outer surface of the sheath 16. When the sheath 16 is positioned in the recess 36 of the docking device 28 in the desired manner, the mounting pad 42 can be attached to the top surface 34 of the docking device 28 (e.g., by welding the pad 42 to the top surface 34 of the device 28) so that the thermocouple device 14 is maintained in the desired location and, in particular, the junction point 24 is maintained in close proximity to, and preferably in firm contact with, the portion of the tube surface 30 that is exposed through the slot 38 in the recess 36. In the embodiment illustrated, the pad 42 is made of a metallic material that is suitable for high temperature environments and that can be attached to the sheath 16 and the device 28 (e.g., by welding). Although the pad 42 is shown attached to the top surface 34 of the device 28, it should be understood that the pad 42 may be attached to other portions of the docking device 28 so that the thermocouple device 14 is maintained in a desired position and location. Further positional stability of the temperature device 14 may be achieved through the use of weld clips 44 that are attached to the tube surface 30 and retain the sheath 16 at various locations along its length.

Figure 6:
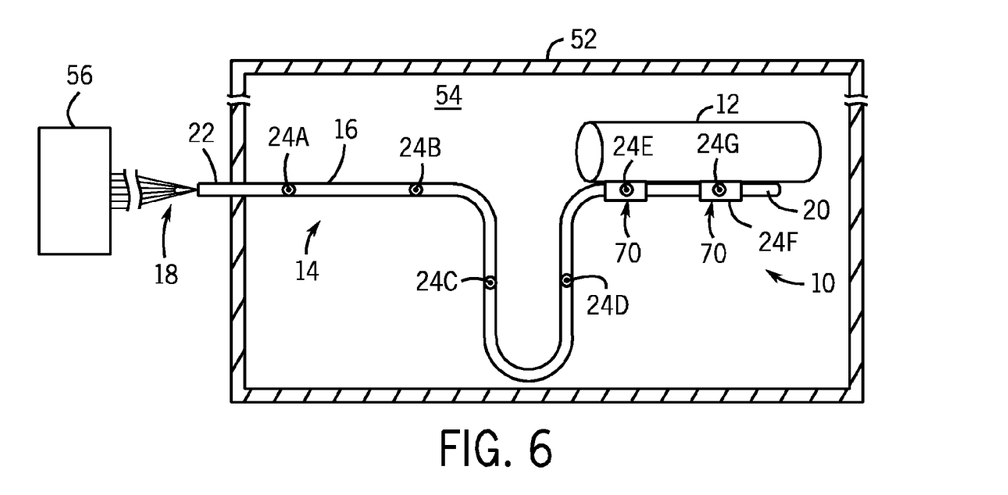
FIG. 6 is a schematic representation of an exemplary environment in which an embodiment of a temperature sensing assembly may be implemented.

As further shown in FIGS. 1, 3 and 4, the temperature sensing assembly 10 can further include a heat shield 46. The heat shield 46 includes a wall 48 which defines a receptacle 50 that shields at least the portion of the sheath 16 that is received in the recess 38 from heat from thermal sources other than the surface 30 of the tube 12. For instance, in certain embodiments of the invention, and as best shown in FIG. 6, temperature readings can be taken of the skin of the tube 12 that is located within the walls 52 of a heated chamber or vessel 54, such as a furnace or reaction vessel used in a petrochemical refining process. As shown in FIG. 6, the end 22 of the thermocouple device 14 extends through the wall 52 of the chamber 54 to a junction box 56 having a terminal block. The one of more conductor pairs 18 of the thermocouple device 14 are connected to terminals of the terminal block. In turn, the terminals can be connected to various instrumentation (e.g., instrumentation 26) which receives the electrical signals on the terminals and converts them to indications of temperature.

In embodiments such as the one shown in FIG. 6, various heat sources within the chamber 54 may affect the temperature indications provided by the device 14. These sources of heat may include radiant sources within the chamber 54, exposed flames that may directly impinge upon the temperature sensing assembly 10, etc. Positioning the heat shield 46 over the portion of the sheath 16 that contains the junction point 24 can reduce the impact other heat sources may have on temperature indications and protect the sheath 16 from direct impingement of open flames. In the embodiment shown in FIGS. 1, 3 and 4, the heat shield 46 is attached to the docking device 28 after the thermocouple device 14 is positioned in the recess 36 and the mounting pad 42 is attached to the top surface 34 of the device 28. As an example, the wall 48 of the heat shield 46 can be made of a metallic material and the edges of the wall 48 may be received in channels 58 formed in the top surface 34 of the docking device 28 and welded in place.

Once assembled, the temperature sensing assembly 10 may be connected to the junction box 56 and instrumentation 26 to receive the electrical signals from the junction point 24 that are indicative of the temperature of the surface 30 of the tube 12. In the event replacement of the thermocouple device 14 is desired or becomes necessary, the heat shield 46 and the mounting pad 42 can be detached from the docking device 28 (and the weld clips 44 may be detached, if present) so that the thermocouple device 14 may be removed from tube 12. The docking device 28 remains attached to the tube 12. A replacement thermocouple device 14 may then be installed by positioning the sheath 16 of the replacement 14 in the recess 36 so that the junction point 24 is located within the recess 36. The mounting pad 42 of the replacement device 14 and the heat shield 46 can then be attached (e.g., welded) to the original docking device 28. The weld clips 44 also may be reattached, as desired. Attachment of the thermocouple device 14 to the docking device 28 rather than the tube surface 30 eliminates the need to perform the time-consuming pretreatment (e.g., grinding to remove excess materials and impurities, heat treating, etc.) of the tube surface 30 so that a replacement thermocouple device 14 can be attached.

In certain implementations of the temperature sensing assembly 10, the thermocouple device 14 may have multiple junction points 24 disposed at unique locations along the length of the sheath 16. An example of multiple junction points 24 contained within the sheath 16 of device 14 is shown schematically in the cross-section view of FIG. 7. In this implementation, the sheath 16 comprises an open interior into which four conductor pairs 18A, 18B, 18C and 18D, extend. Although four conductor pairs 18 are shown, fewer or more conductor pairs may be included within the sheath 16. As can best be seen in the cutaway portion of the sheath 16 in FIG. 2, an insulation material 60, such as an electrical insulation material, is disposed about the individual conductors of the conductor pairs 18A-D. The insulation material 60 generally fills the interior about the conductor pairs 18A-D. Although various electrical insulation materials may be used, an exemplary material comprises magnesium oxide (MgO).

Figure 7:
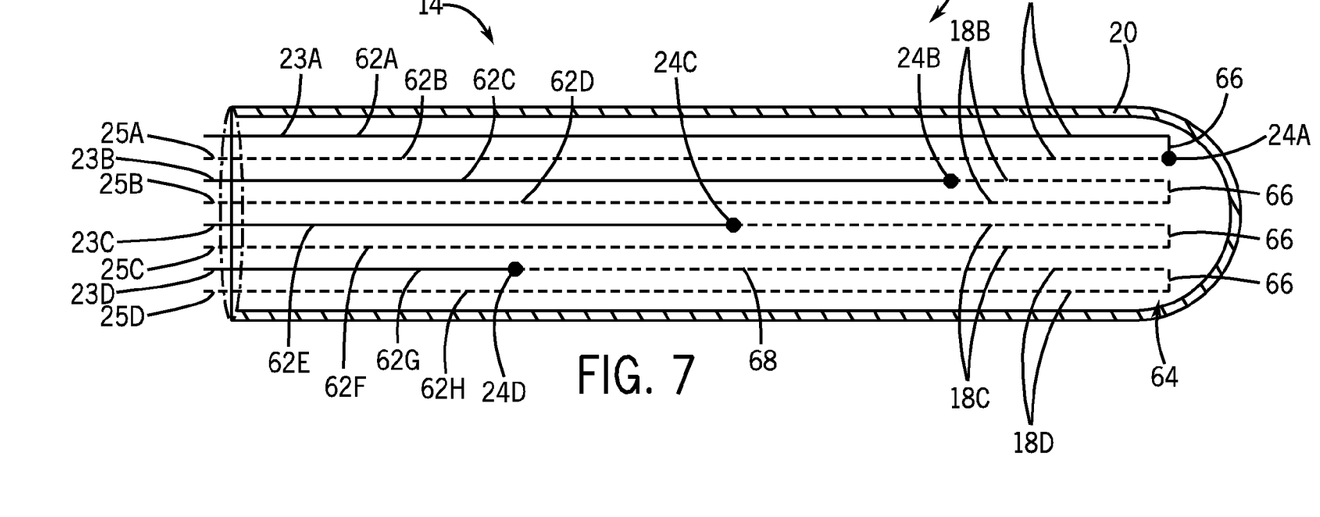
FIG. 7 is a schematic, cross-sectional view of an exemplary thermocouple device, in accordance with an embodiment of the invention.

With reference to FIG. 7, temperature can be determined at a plurality of locations along the length of the sheath 16 by forming junction points 24A, 24B, 24C, 24D at selected locations along the sheath 16. By way of example, the embodiment of FIG. 7 illustrates four conductor pairs 18A-D each having its own unique junction point 24A-D, respectively. The junction points 24A-D are formed at unique longitudinal locations along the sheath 16 to permit the sensing of temperature at those unique locations.

Each conductor pair 18A-D comprises a first conductor 23 (i.e., 23A, 23B, 23C, or 23D) illustrated in solid line and a second conductor 25 (i.e., 25A, 25B, 25C or 25D) illustrated in dashed line in FIG. 7. The first conductor 23 and the second conductor 25 of each conductor pair 18 are made of dissimilar conductive materials, such as iron/constantan, chromel/alumel, copper/constantan, chromel/constantan, etc. Various combinations of different conductor pair types can be utilized within a single sheath or the conductor pairs may all be of the same type. A variety of materials also may be used to form the sheath 16, such as stainless steel and Inconel, as may be appropriate for the particular application in which the thermocouple device 14 is employed.

Although a variety of techniques may be used to join the dissimilar conductors 23A-D/25A-D at desired junction points 24A-D within the sheath 16, one technique is to provide conductor pairs 18A-D by forming a plurality of rods 62A-H that extend into the sheath 16 to distal end 20. The rods 62A-H are preformed of the material of first conductor 23A-D, second conductor 25A-D, or a combination of the two conductors. For example, in FIG. 7, four rods (i.e., rods 62B, 62D, 62F, 62H) are formed of the material of second conductor 25, one rod 62A is formed of the first conductor material 23, and three rods (i.e., rods 62C, 62E, 62G) are formed of a combination of first conductor material 23 and second conductor material 25 that are joined at the desired junction point 24 (i.e., points 24B, 24C, 24D). When the rods 62A-H are placed within the sheath 16, the junction points 24A-D are disposed at desired locations for sensing temperature.

Each of the rods 62A-H has a distal rod end 64, and the appropriate pairs of rod ends 64 are joined together to form conductor pairs 18A-D. Although distal rod ends 66 may be joined in a variety of manners, the distal rod ends 64 may be fused, e.g., welded, together at a fusion end 66. Alternatively, a cross piece or cross rod may be utilized. For example, a cross piece formed of the appropriate conductor material may be welded or otherwise joined to corresponding rod ends. When joined, at least some of the conductors comprise a return segment 68 that returns the conductor from the distal end 66 to a junction point 24, e.g., point 24D, within the sheath 16. As shown in FIG. 7, the rods 62A-H of a conductor pair 18A-D remain spaced apart from one another along the entire length of the sheath 16 until they are joined at their respective distal ends 66 at the distal end 20 of the sheath 16.

Although various processes may be used to form the thermocouple device 14, one exemplary methodology comprises preparing the rods 62 having dissimilar materials by, for example, welding the dissimilar conducting materials together at a predetermined point 24. The combination rods 62 along with the remaining rods 62 are then passed through the insulation 60 within the open ended sheath 16. The insulation 60 may initially be placed within the sheath 16 in the form of beads. The sheath 16 is then swaged to compact the insulation 60 and the sheath 16.

Following swaging, the insulation 60 is removed at the distal end 20 and the appropriate rods 62 are coupled to form conductor pairs 18. For example, cross pieces 66 may be welded across appropriate rod distal ends 64. An appropriate insulation material 60, such as magnesium oxide powder, is placed around the protruding rod ends and a sheath cap can be attached to the remainder of the sheath 16 by, for example, welding.

In various implementations, a junction point 24 may be formed following swaging. For instance, in some applications and as can best seen in FIGS. 8 and 9, it may be desirable to position a junction point 24 in close proximity to or extending outside the sheath 16 at a selected location. Such positioning may be accomplished by removing a section of the sheath 16 at a desired location to expose the insulation 60, removing the insulation 60 to expose the selected conductor pair 18, and positioning and connecting the conductor pair 18 to form a junction point 24 at the selected location. In such implementations, the conductor pairs 18 corresponding to the junction points that are formed after swaging may not extend in a spaced apart manner along the entire length of the sheath 16.

Figure 8:
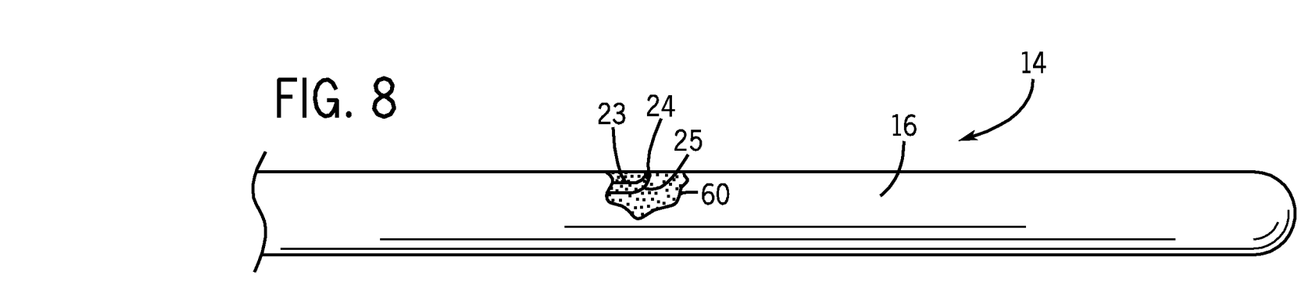
FIG. 8 is a side view of an exemplary thermocouple device with a partial cutaway portion that exposes an exemplary conductor pair.
Figure 9:
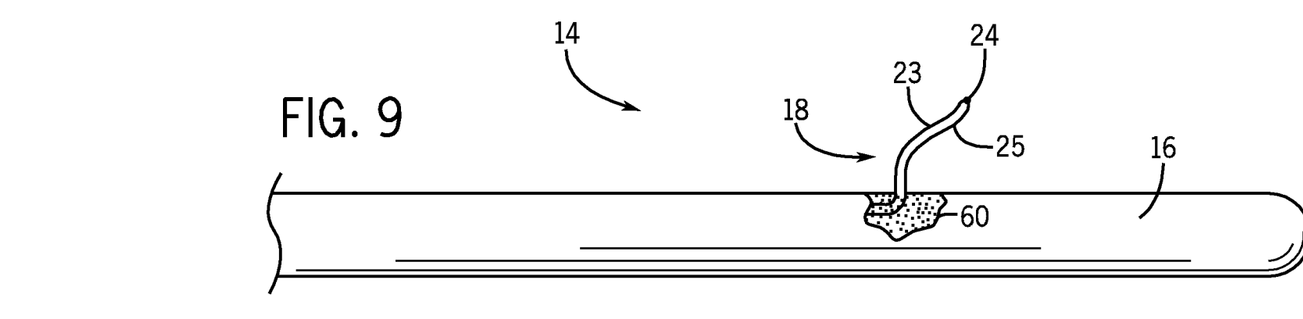
FIG. 9 is a side view of an exemplary thermocouple device with a partial cutaway portion that exposes another exemplary conductor pair.

As an example, the conductor pair 18 may comprise a first conductor 23 made entirely of a first conductive material and a second conductor 25 made entirely of a second conductive material, each of which extends along the length of the sheath 16 only to the selected location at which the junction point 24 is formed. In some embodiments, and as shown in FIG. 8, the conductor pair 18 may simply terminate at the junction point 24 that is formed at the selected location. In other embodiments, and as shown in FIG. 9, a portion of a conductor pair 18 and its corresponding junction point 24 may extend outside the sheath 16. In such embodiments, the conductors 23, 25 of the conductor pair 18 that extends outside of the sheath 16 may be encased with an electrical insulator. Such a conductor pair 18/junction point 24 may be used as a "sacrificial thermocouple," as will be explained in further detail below. Regardless of the ultimate location of the junction point 24 inside or outside of the sheath 16, once the junction point 24 is formed in this manner, the insulation 60 and sheath material may be reworked as needed (e.g., by patching the insulation and sheath material, grinding the surface of the sheath 16, etc).

Regardless of the particular configuration, the thermocouple device 14 can be employed to measure the temperature at one or multiple locations within the heated chamber 54, including at one or multiple locations along the surface of a structure (e.g., tube 12) within the heated chamber 54. For instance, as shown in FIG. 6, the temperature sensing assembly 10 includes the thermocouple device 14 having seven junction points 24A-G. The assembly 10 further includes mounting assemblies 70 for positioning and shielding the two junction points 24E and 24F at desired locations at the surface of the tube 12. The remaining junction points 24A-D and 24G may be attached directly to the surface of the tube 12 at other selected locations (e.g., point 24G), may be attached to other structures in the thermal chamber 54 or may be positioned to monitor the ambient temperature at various selected locations within the chamber 54 (e.g., points 24A-D). The junction points 24A-G may be formed in any of a variety of manners, including those described above.

In the embodiment shown in FIG. 6, the junction point 24G is provided as a sacrificial thermocouple. The term "sacrificial" is used herein to indicate that the useful life of the junction point is expected to be short relative to the life of the junction points that are encased within the sheath 16. Despite its shortened life, a sacrificial thermocouple (e.g., point 24G) may be useful to provide extremely accurate temperature indications that may be used to calibrate the indications provided by the encased junction points. For instance, as shown in FIG. 6, the junction point 24G of the sacrificial thermocouple can be directly attached to the surface of the structure 12 proximate the location at which the encased junction point 24F is located. Attachment may be accomplished in a variety of manners, including by forming a shallow recess in the surface of the tube 12 (e.g., by peening the surface) and welding the junction point 24G within the recess. Because the junction point 24F is directly attached to the surface of the structure 12 (i.e., without any intervening mounting structures that may provide thermal resistance in the conductive path between the surface of the structure 12 and the junction point 24G), the junction point 24G can provide an extremely accurate indication of the surface temperature. The temperature indication of the sacrificial junction point 24G may then be compared to the temperature indication received from the junction point 24F which is thermally coupled to the tube surface through the mounting assembly 70. Any difference between the temperature indications can be used to calibrate the indications received from the junction point 24F that is not directly attached to the tube surface.

Figure 16:
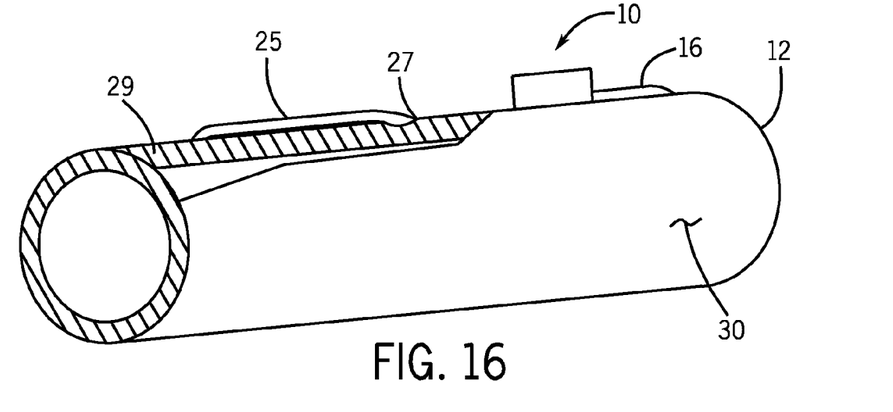
FIG. 16 is a perspective view of another exemplary embodiment of a temperature sensing assembly, including a sacrificial thermocouple, attached to the surface of a tube.

In the embodiment shown in FIG. 6, the junction point 24G of the junction point is formed by a conductor pair that extends partially within the sheath 16 and then extends exterior of the sheath 16 (such as shown in FIG. 9). In other embodiments, such as the embodiment shown in FIG. 16, a sacrificial thermocouple 25 that is completely separate from the thermocouple assembly 10 is employed. In this embodiment, the thermocouple 25 includes a conductor pair that terminates in a junction point 27 that is attached directly to the surface 30 of the tube 12, such as by grinding a portion 29 of the surface 30 and then peening the point 27 into the surface 30 of the tube 12. Similar to the embodiment shown in FIG. 6, the point 27 is positioned proximate a temperature assembly 10. In this manner, the temperature indication received from the point 27 can be used to calibrate temperature indications received from one or more junction points contained with the sheath 16 of assembly 10.

With reference again to FIG. 6, in one implementation of the embodiment shown, each of the mounting assemblies 70 includes the docking device 28 with the recess 36 and the heat shield 46. The portion of the sheath 16 received within the recess 36 includes the mounting pad 42 which is attached to the docking device 28. In other implementations, one or both of the mounting assemblies 70 may include the heat shield 46 but not a docking device 28. In such implementations, the portion of the sheath 16 that is contained within the heat shield 46 may be attached to a weld pad that is directly attached to the surface of the tube 12. Any of a variety of other mounting arrangements also can be used to couple the thermocouple device 14 to the surface of the tube 12.

Figure 10:
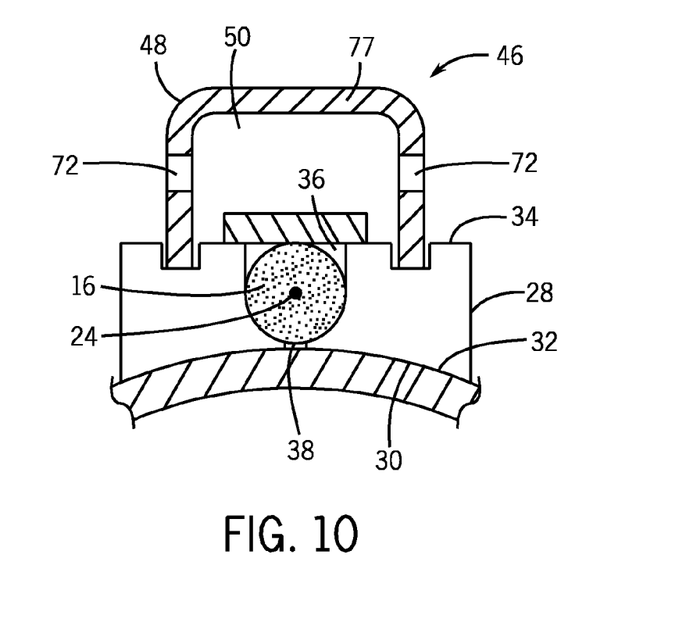
FIG. 10 is a partial cross-sectional view of another embodiment of the assembled temperature sensing assembly of FIG. 3 taken through the heat shield and docking device, according to an embodiment of the invention.
Figure 11:
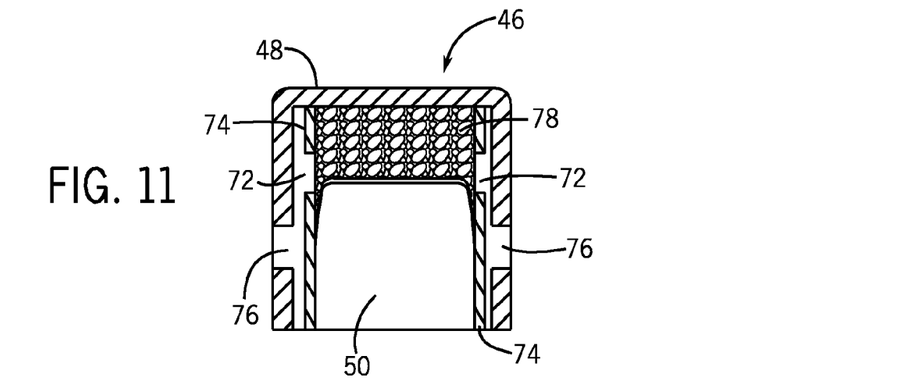
FIG. 11 is a cross-sectional view of an exemplary embodiment of a heat shield.

In various implementations, the heat shield 46 is configured to allow convection through the receptacle 50 defined by the wall 48 of shield 46. In such embodiments, and as shown in FIG. 10, a plurality of apertures 72 are formed through the wall 48 of the shield 46 so that an air flow can pass through the receptacle 50 while, at the same time, the shield 46 protects the thermocouple device 14 from impingement of direct flames. The apertures 72 may be any of a variety of shapes, such as circular, oval, and slotted, and may be arranged in any of a variety of patterns that allow air to move through the receptacle 50. In some embodiments, apertures 72 also may be formed through a top wall portion 77 of wall 48. In yet other embodiments, such as the embodiment shown in FIG. 11, the heat shield 46 includes a second wall 74 adjacent and spaced from the first wall 48 and having apertures 76 formed therethrough. As can be seen in FIG. 11, the second apertures 76 are offset from or are not aligned with the apertures 72 that extend through the first wall 48. This arrangement can enhance the protection provided to the thermocouple device 14 since it provides a further impediment to prevent flames from directly impinging on the thermocouple device 14. As a further alternative, the wall 74 may include only the two side wall portions as shown or may also include a top wall portion that is adjacent the top wall portion 77 of the first wall 48.

Embodiments of the heat shield 46 may also include a layer of insulation to further shield the thermocouple device from heat. For instance, the shield 46 shown in FIG. 11 includes a layer of insulation 78 within the receptacle 50. The insulation 78 may be made of a variety of suitable materials, including KAOWOOL™ or INSULFRAX®, as examples.

Figure 12:
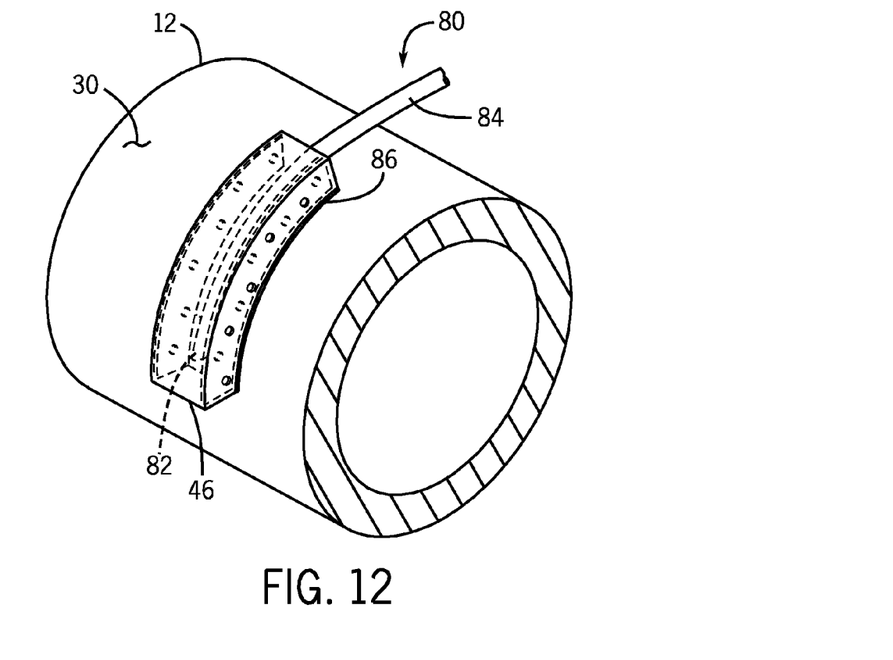
FIG. 12 is a perspective view of another exemplary embodiment of a temperature sensing assembly attached to the surface of a tube.
Figure 13:
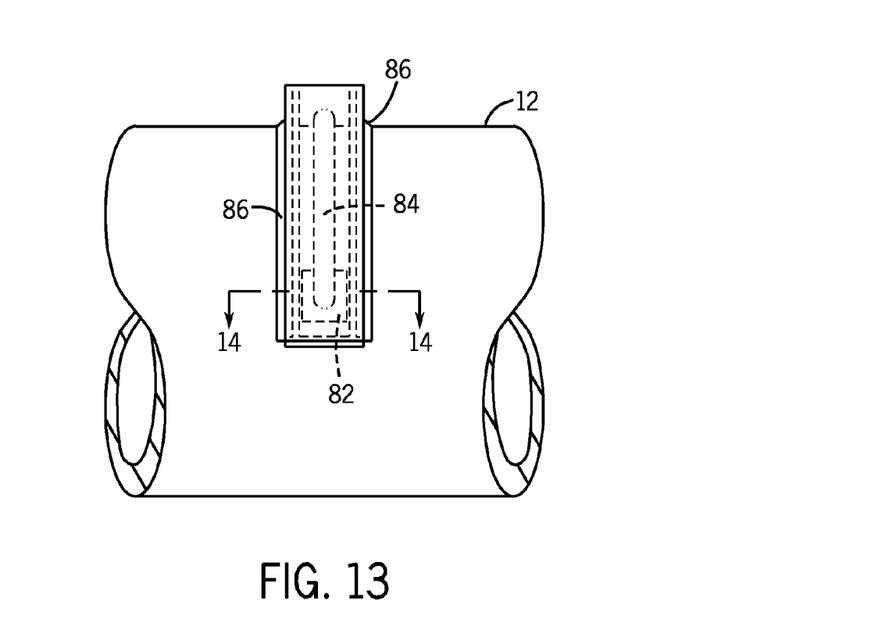
FIG. 13 is a top view of the exemplary temperature sensing assembly and tube of FIG. 12.
Figure 14:
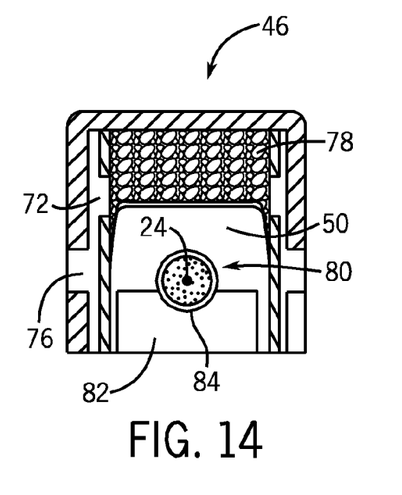
FIG. 14 is a partial cross-sectional view of the exemplary temperature sensing assembly of FIG. 13 taken generally along the line 14-14.

It is noted that the various implementations of the heat shield 46 may be employed either with or without the docking device 28. For instance, as can best be seen in the perspective view of FIG. 12, the top plan view of FIG. 13, and the partial cross-sectional view of FIG. 14 (which is taken along the line 14-14 of FIG. 13), a thermocouple device 80 is attached to the surface 30 of the tube 12 via a weld pad 82 that is attached to the sheath 84 of the device 80. As an example, the weld pad 82 first may be welded to the sheath 84. At a later time, the weld pad 82 can be welded to the surface 30 of the tube 12 at a location that has been properly prepared (e.g., cleaned and heat treated). The heat shield 46 may then be placed over a portion of the sheath 84 and attached to the surface 30 of the tube 12 at attachment points, e.g., welds 86. In the embodiment shown in FIGS. 12-14, the heat shield 46 includes the wall 48 defining the receptacle and the inner wall 74, although other embodiments may omit the inner wall 74. Apertures 72 extend through the wall 48 and apertures 76 extend through the wall 74. The apertures 72 and 74 are offset to prevent the impingement of open flame on the portion of the thermocouple device 80 positioned within the receptacle 50 while allowing air to flow through the receptacle. Insulation 78 fills the top portion of the receptacle 50 to provide additional heat shielding to the thermocouple device 80, although other embodiments may omit insulation 78.

Figure 15:
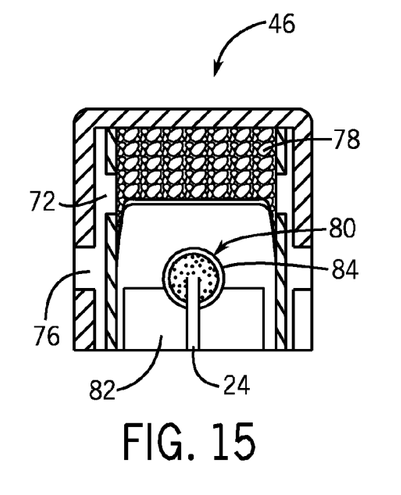
FIG. 15 is a partial cross-sectional view of another embodiment of the temperature sensing assembly of FIG. 13 taken generally along the line 14-14.

FIG. 15 shows another implementation of the heat shield 46 and weld pad 82 used in conjunction with the device 80. In this embodiment, the junction point 24 extends outside of the sheath 84 and through the weld pad 82 to enhance the thermal coupling between the point 24 and the surface 30 of the conduit 12 to which the weld pad 82 is attached.

Figure 17:
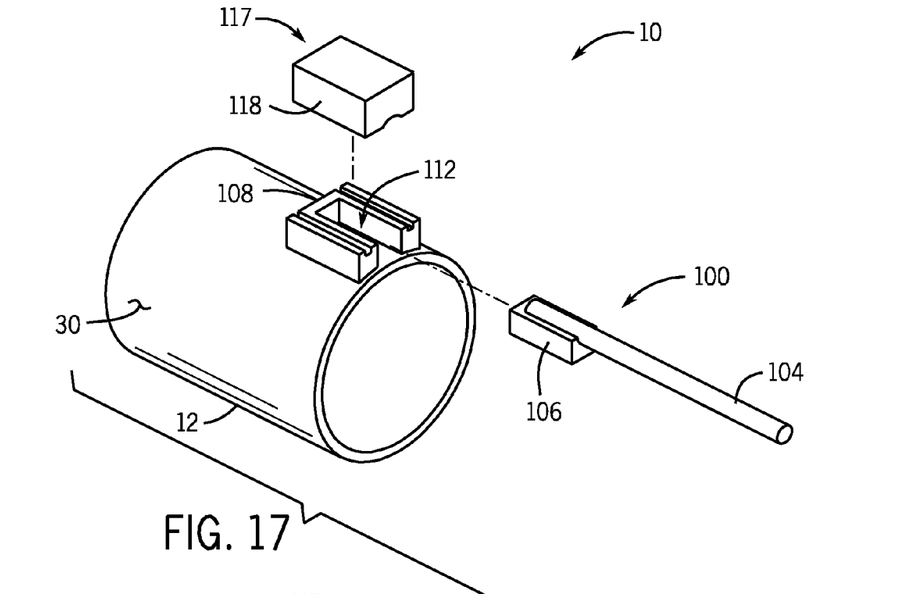
FIG. 17 is an exploded view of an exemplary temperature sensing assembly, according to another embodiment of the invention.
Figure 18:
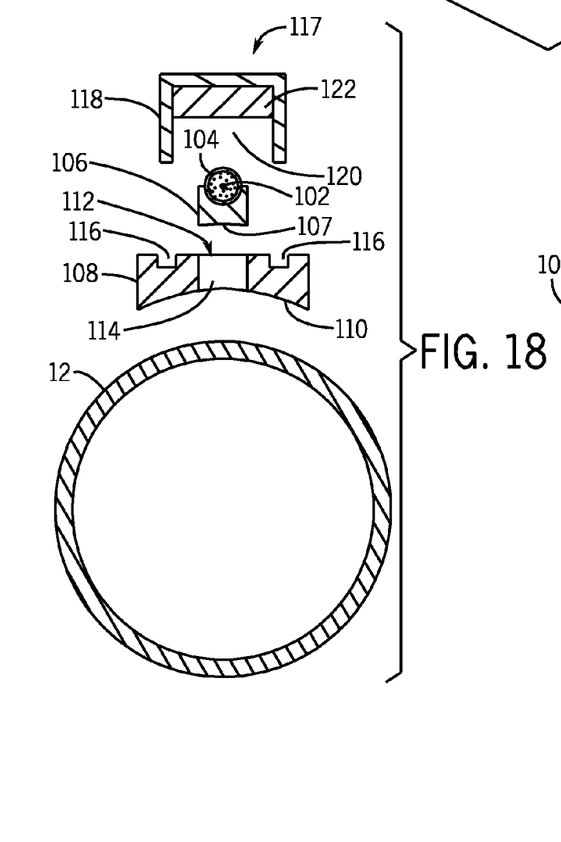
FIG. 18 is an exploded partial cross-sectional view of an exemplary embodiment of the temperature sensing assembly of FIG. 17.
Figure 19:
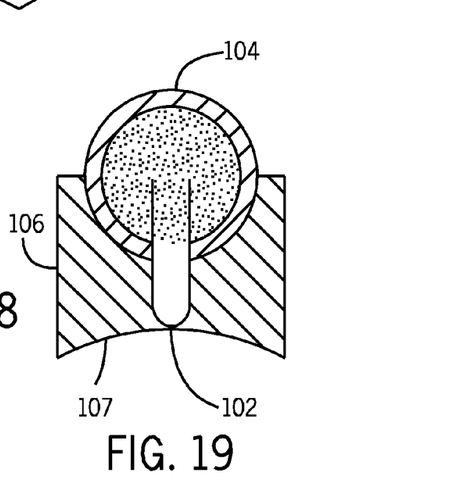
FIG. 19 is a partial cross-sectional view of an exemplary temperature sensing device of the assembly of FIG. 17.

Turning now to FIGS. 17-20, an alternative implementation of the temperature sensing assembly 10 is shown. FIG. 17 is an exploded view of the assembly 10 for sensing the temperature at the surface 30 of the tube 12. FIG. 18 is an exploded cross-sectional view of the assembly 10 and tube 12. FIG. 19 is a cross-sectional view of an alternative embodiment of a thermocouple device 100 of the assembly 10.

In the embodiment shown in FIGS. 17-19, the assembly 10 includes the thermocouple device 100 having one or more junction points 102 disposed within a sheath 104. The device 100 further includes a mounting pad or block 106 that is attached to the sheath 104, such as by welding. In other embodiments, the block 106 may be integrally formed as part of the sheath 104. As can be seen in FIG. 18, the block 106 has a bottom surface 107 having a shape that is complementary to the shape of the surface 30 of the tube 12 so that a close thermal coupling can be achieved between the surface 107 and the surface 30 when the assembly 10 is attached thereto.

The assembly 10 further includes a mounting or docking device 108 that attaches to the surface 30 of the tube 12. As shown in FIG. 18, the docking device 108 has a bottom surface 110 having a shape that is complementary to the shape of the surface 30 of the tube 12 so that a close thermal coupling can be achieved between the device 108 and the tube 12. The device 108 further includes a recess 112 to receive the thermocouple device 100. In this embodiment, the recess 112 is configured to receive the mounting pad or block 106 of the device and includes a slot 114 that extends through the bottom surface 110 of the device 108 so that the bottom surface 107 of the block 106 can be brought into contact with the surface 30 of the pipe 12. The block 106 is received within the recess 112, such as with a snug fit, so that the thermocouple device 100 is maintained in position. In some embodiments, the device 100 may be further secured in position, such as by welding the block 106 to the mounting device 108. The docking device 108 further includes channels 116 to receive a heat shield 117. The shield 117 includes a wall 118 that defines a receptacle 120 to shield the sheath 104 from heat from sources other than the surface 30 of the tube 12. The heat shield 117 further includes a layer of insulation 122 within the receptacle 120 to further shield the device 100 from heat.

FIG. 19 is a cross-sectional view of an alternative implementation of the thermocouple device 100. Here, the junction point 102 extends outside of the sheath 104 and through the mounting pad or block 106 to terminate at its bottom surface 107 so that the thermal coupling between the junction point 102 and the surface 30 of the tube 12 is enhanced.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of monitoring temperature of a surface of a structure, comprising:
    attaching a bottom surface of a docking device to the surface of the structure, the docking device having a recessed portion formed in a top surface of the docking device and extending through the bottom surface;
    positioning a thermocouple device within the recessed portion after the bottom surface of the docking device is attached to the surface of the structure, wherein the thermocouple device comprises at least one junction point disposed within an elongate sheath to measure temperature at a first location on the structure, and wherein the thermocouple device is positioned within the recessed portion so that the junction point is adjacent to the surface of the structure at the first location; and
    attaching a heat shield to the docking device to shield the junction point from heat from thermal sources other than the surface of the structure.

2. The method as recited in claim 1, wherein the heat shield comprises a wall having a plurality of apertures formed therethrough to allow air flow through the heat shield.

3. The method as recited in claim 1, wherein the thermocouple device comprises a pair of conductors joined at a second junction point to measure temperature at a second location on the structure, and wherein the method further comprises positioning the second junction point at the second location.

4. The method as recited in claim 3, wherein positioning the second junction point comprises attaching the second junction point directly to the surface of the structure at the second location.

5. The method as recited in claim 4, wherein the second pair of conductors and the second junction point extend outside of the elongate sheath.

\* \* \* \* \*